United States Patent [19]
Law et al.

[11] 3,790,091
[45] Feb. 5, 1974

[54] SOLID WASTE SEPARATING METHOD AND CLASSIFICATION OF MATERIAL

[75] Inventors: Edward Law, Fort Wayne, Ind.; James H. Moore, Dallas, Tex.

[73] Assignee: National Recycling Inc., Fort Wayne, Ind.

[22] Filed: June 7, 1971

[21] Appl. No.: 150,671

[52] U.S. Cl................... 241/24, 241/27, 241/68, 241/79, 44/10 R, 44/25, 100/39, 100/91
[51] Int. Cl................................................. B02c 18/40
[58] Field of Search.... 241/24, 25, 27, 68, 79, 79.2, 241/101 R; 44/10 R, 25, 1 R; 100/39, 91, 95, 96, 97

[56] References Cited
UNITED STATES PATENTS

| | | | |
|---|---|---|---|
| 3,477,649 | 11/1969 | Dalberg et al. | 241/24 |
| 3,636,864 | 1/1972 | Loscialo | 100/97 X |
| 3,506,414 | 4/1970 | Skendrovic | 44/10 R X |
| 3,159,353 | 12/1964 | Atwater | 241/39 |
| 3,524,594 | 8/1970 | Anderson et al. | 241/24 X |
| 3,557,685 | 1/1971 | Schroering | 241/24 X |
| 3,604,179 | 9/1971 | Lund | 241/24 X |
| 3,635,409 | 1/1972 | Brewer | 241/43 |

*Primary Examiner*—Granville Y. Custer, Jr.
*Attorney, Agent, or Firm*—Albert L. Jeffers; Roger M. Rickert

[57] ABSTRACT

A method for separating solid waste material into identifiable classifications by recycling the solid waste material obtained from industrial or domestic source through a number of devices which reduces the solid waste material to a uniform workable particle size; separating the presized particles by weight, size and magnetic properties; transferring the classified material to a number of disposal areas wherein the materials such as heavy paper material may be baled, the light paper and plastic may be pelletized for use as fuel, the metal and glass shipped to reprocessing plants, and the remainder of the solid waste material may be disposed of by land fill or incineration.

The invention further relates to an anti-pollution method for solid waste material which conserves the virgin natural resources by reclaiming useful material and minimizing areas needed for land filling, and reduces the solid waste management problem.

16 Claims, 10 Drawing Figures

INVENTORS
EDWARD LAW
JAMES H. MOORE
by Jeffers & Rickert
Attorneys

SOLID WASTE SEPARATING METHOD AND CLASSIFICATION OF MATERIAL

BACKGROUND OF THE INVENTION

The present invention relates to a recycling method for solid waste material obtained from domestic and commercial sources wherein certain materials, such as paper, glass and metal are separated and returned to reprocessing plants, which permits the conservation of virgin natural resources and minimizes the area needed for land filling operations, and reduces the solid waste management problems.

Many types of devices have been suggested for reclaiming useful materials, but none were found having the ability to return 70 percent or more of all recoverable materials which may be recycled back into the economy by way of reprocessing plants at a minimim cost. For example, Dalberg U.S. Pat. No. 3,477,649 dated Nov. 11, 1969, is the closest prior art found to the present invention for separating solid waste material.

SUMMARY OF INVENTION

The present invention relates to a method for separating solid waste material into identifiable classifications so that useable material may be reclaimed and sent to reprocessing plants for re-use. The solid waste material which may be obtained from industrial and domestic sources is placed in a pit, or on a concrete slab, and thereafter conveyed through a number of devices which reduces the solid waste material to a uniform workable particle size and separates the particle size solid materials by weight, size and magnetic properties so that they may be classified in categories for shipping to reprocessing plants, or utilized in making pellets for fuel, with the remaining solid waste material which cannot be utilized being disposed of by land fill operation or by incineration.

The solid waste material is transferred from the pit or slab to a presizer which shreds to solid waste material to a small workable size of approximately 4 × 5 inches, which is no larger than the size of a man's hand.

The presizer shreds the solid waste material, as opposed to cutting, so that its edges are flared rather than being smooth, wherein the larger the flare and the larger the edges of the material, in particular with reference to paper, permits the transferring air to utilize a larger surface area on which to act in the separating method pertaining to this invention. In addition, the flared edges permit visual classification or identification of the solid waste material, particularly the paper, by an individual so that the reclaimed material can be shipped to the proper reprocessing plant.

On the underside of the presizer a vibrating conveyor is positioned to receive the shredded solid waste material. The vibrating conveyor spreads the particles as it transfers the particles through an aspirator which removes very light paper, such as kleenex and carbon paper, along with plastics, and transfers such light objects by air to a cyclone which serves to release the air to the atmosphere. The remaining solid waste material is transferred underneath an electromagnetic conveyor which removes the ferrous material and thereafter releases the ferrous material onto another conveyor, which passes through an aspirator for removing small particles of paper or other debris which may have attached itself to the ferrous material. The ferrous material is then placed in a tote box for storage, or may be placed in a truck to be shipped to a reprocessing plant.

The remaining solid material is then conveyed to a vibrating screener which separates the material by particle size. The vertical screener can be used for glass separation, in which event the glass is transferred to a conveyor which transfers the glass to a disposable area for shipment to a reprocessing plant. The remainder of the solid material is transferred to a conveyor which may be monitored by an individual for removing such articles as copper and brass. The vibrator screener is also provided with an aspirator for removing the lighter materials, including paper and plastic, which has not previously been removed, and transfers such light articles by air to a cyclone which is vented to the atmosphere for releasing the air so that the solids may fall by gravity to a rotary screener which functions to separate the heavy solids by particle size, wherein the heavier solids are transferred by an alternate conveyor to a disposal area for transfer to land fill. The lighter solids, which are primarily plastic and paper, are transferred to a plastic and paper separator which transfers the separated products to two different cyclones. The heavier solids are usually re-useable paper which may be baled and shipped to a paper reprocessing plant. The lighter materials, being primarily plastic and light paper, are pelletized for use as fuel.

With the foregoing in mind, a particular object of the present invention is the provision of a method for separating solid waste material into identifiable classifications by recycling the solid waste material through a number of devices which reduces the solid waste material to a uniform workable particle size, and separates the reduced particle size by weight, size and magnetic properties.

Another object of the present invention is the provision of a method of classifying the recycled solid waste material so that certain materials may be pelletized for use as fuel, while other products may be classified for use in paper reprocessing plants, and other classified material, such as metal, may be identified to be shipped to metal reprocessing plants, with the remainder beng disposed of by land fill or incineration.

A still further object of the present invention is the provision of a method of operating a solid waste material recycling plant which is substantially fully automated, and which recycles the solid waste material at a minimum cost.

It is also an object to provide a method of separating solid waste material into identifiable classifications by utilizing mechanical devices in combination with controlled air aspirators, and air transferring ducts.

These and other objects and advantages of the present invention will become more apparent upon reference to the following detailed specification, taken in connection with the accompanying drawings in which:

Figure 1:
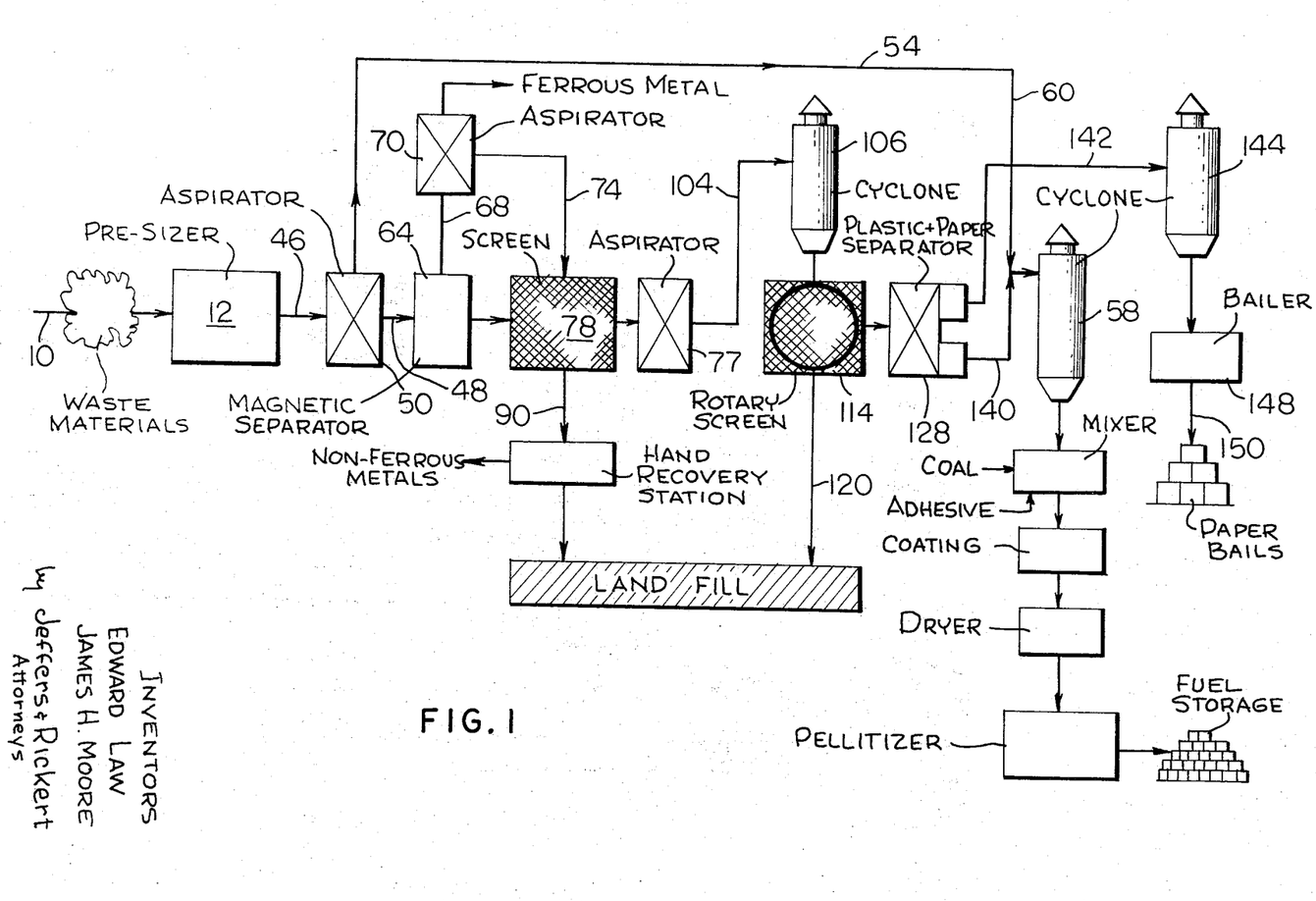
FIG. 1 is a schematic diagram of a solid waste material system embodying the invention.

Referring to FIG. 1, the solid waste recycling process is illustrated in schematic form wherein the endless conveyor 10 transfers the solid waste material from a pit, or solid concrete slab (not shown), to a presizer 12 which functions to reduce the solid waste material to a uniform size so that it can be further classified in the later stages of the recycling process. After passing through the presizer 12, the solid waste material falls onto a vibrating conveyor 46 which transfers the solid waste material to an endless conveyor 48. An aspirator hood 50 is disposed above the vibrating conveyor 46 to remove light material, such as thin paper, kleenex and light plastic, for transfer through ducts 54 and 60 directly to the cyclone 58.

The endless conveyor 48 passes under a crossbelt or in-line electromagnetic separator 64 having enough gauss force to remove the magnetic material from the other solid waste material. The magnetic material is released at a predetermined point and is transferred to an endless conveyor 68 which passes beneath an aspirator 70 which removes any paper or other light material which may have attached itself to the magnetic material, and transfers such material through a duct 74 to a vibrating screener 78. The solid material remaining on the conveyor 48 is transferred to the vibrating screener 78, which separates the solid waste material by particle size and transfers the solid particles to a conveyor 90 which conveyor may be monitored by a person to remove non-ferrous metals such as copper, brass and aluminum. The remaining material on the conveyor 90 is then transferred to a land fill, or to an incinerator.

The screener 78 is provided with an aspirator 77 for removing plastic and paper material, and transfers the material through a duct 104 to a cyclone 106. From the cyclone 106 the material is transferred to a rotary screener 114 having a rotating tumbler which separates the dirt and glass, and other fine solid materials which are discharged by a rotary screw conveyor 120 to land fill. The paper and plastic are discharged from the rotary screener to a plastic separator 128 which separates the plastic and light paper from the heavy paper. The light paper and plastic are transferred through duct 140 to the cyclone 58, and the heavy paper is transferred through duct 142 to the cyclone 144. From the cyclone 58 the light paper and plastic is transferred to a mixer for the addition of fine coal thereto. If desired, an adhesive may be added to the mixer for coating the material and thereafter passes through a drier to dry the coating and set the adhesive with respect to the material. Thereafter the material is passed through a pelletizer for compacting the material to increase the density of the material so that it may be used as fuel. The pellets may be stored, or fed directly into a power generator plant. In the event the pelletized material is fed directly into a power generating plant it is not necessary to add the adhesive coating, which is added primarily to prevent the deterioration of the pellets. Such a coating will also protect the pellets from insect attraction since the adhesive material is pathogenic free. When the adhesive is not applied, the drier can be eliminated from the recycling process. From the cyclone 144 the heavier paper is transferred to a baler 148 which compacts the material into bales which are transferred by the conveyor 150 to a storage area. The bales of paper may be classified in different categories and may be used for the production of plaster board, roofing, and other various products in accordance with its particular classification.

Figure 2A:
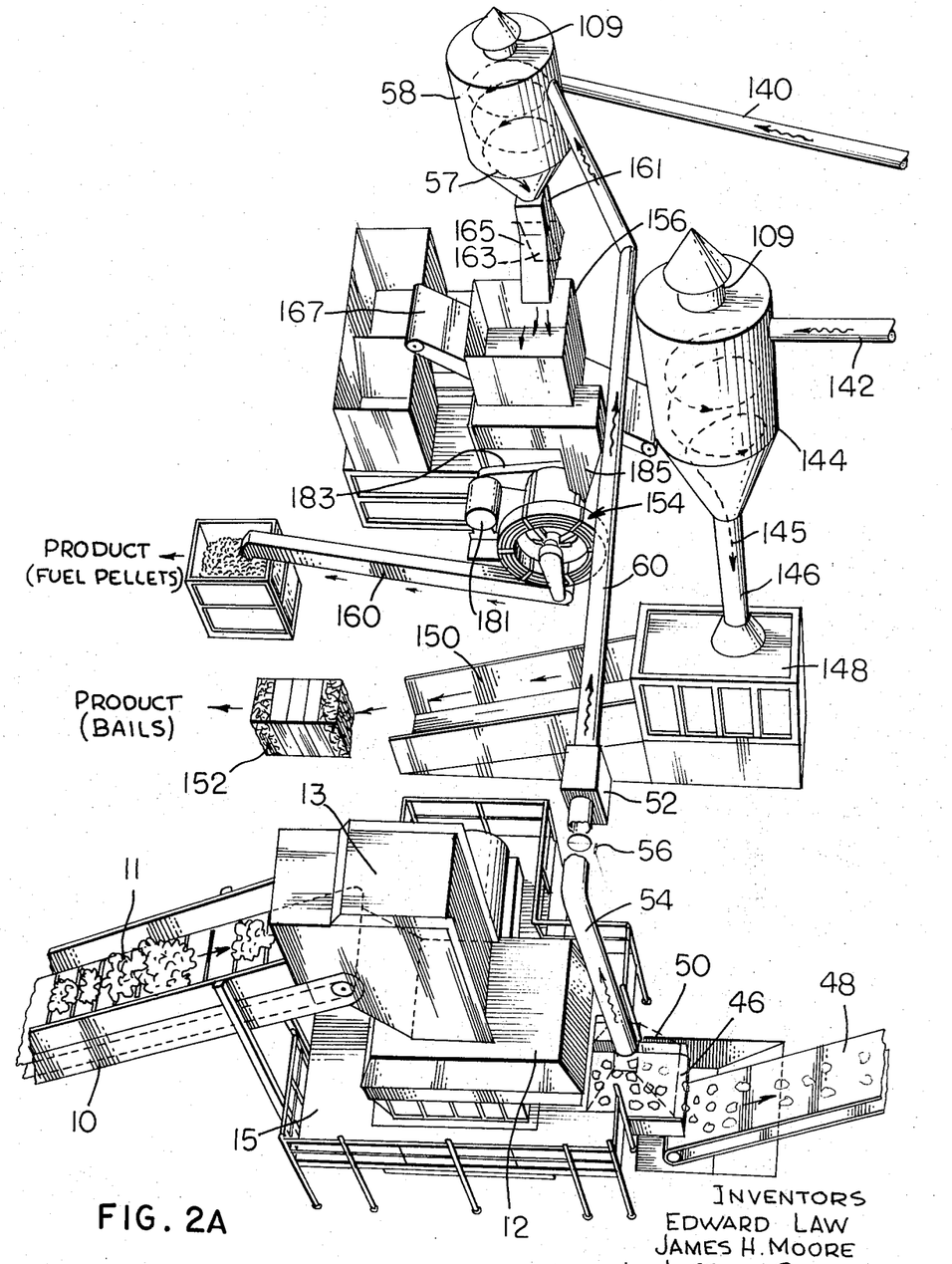
FIGS. 2a and 2b are a pictorial schematic representation of the solid waste material system combining the inventions illustrated in FIG. 1, with the arrangement progressing from left to right.
Figure 2B:
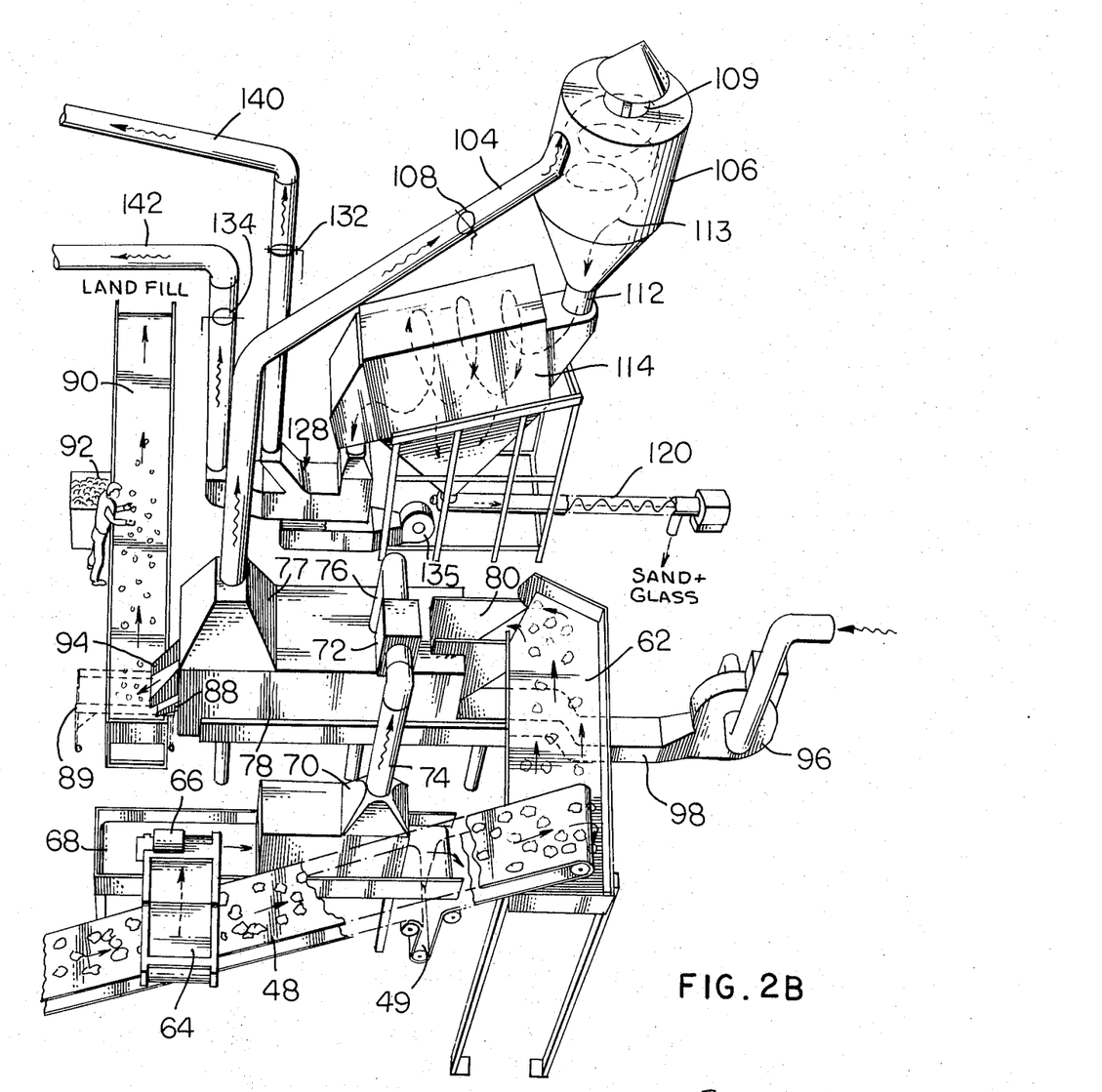
Figure 3:
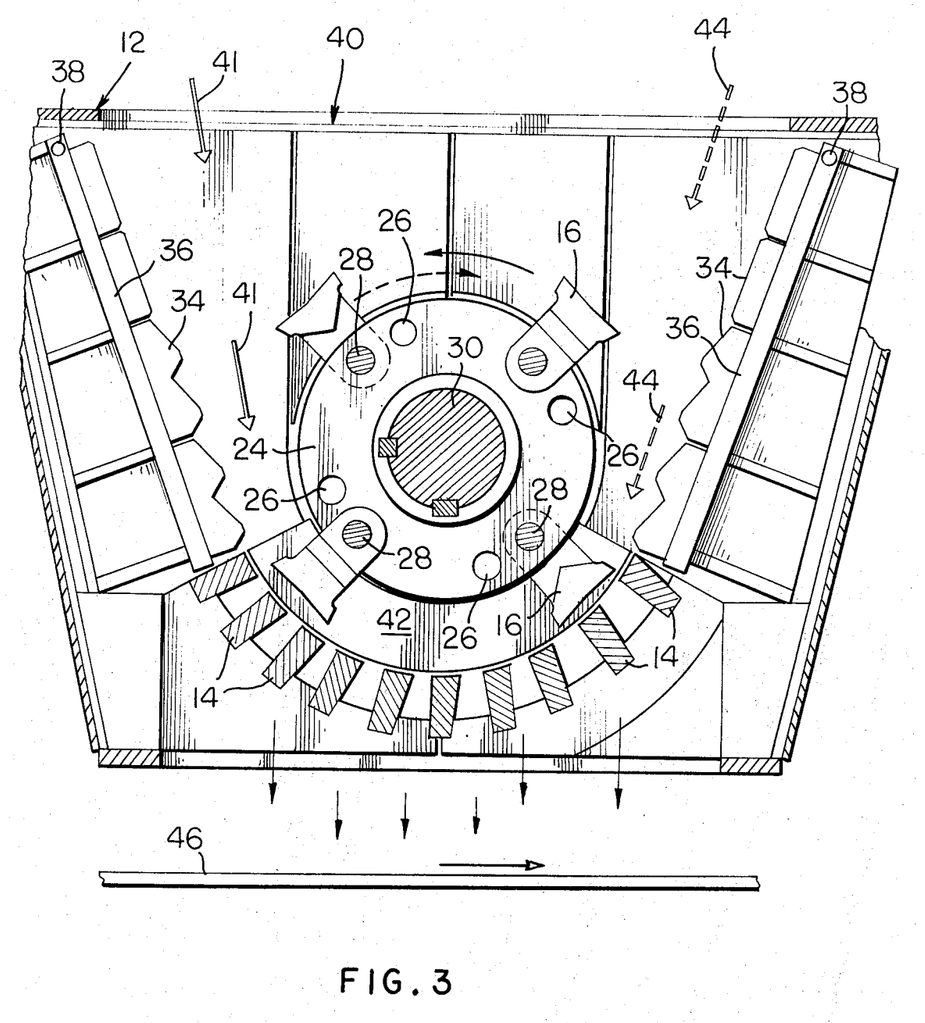
FIG. 3 is a sectional view of the presizer, showing a conveyor for transferring the reduced solid particles.

Referring now to FIGS. 2a through 9, a more detailed description of the construction and operation of the recycling process is illustrated. Referring particularly to FIGS. 1, 2a and 3, the presizer 12 receives the solid waste material 11 from the conveyor 10, through a hopper 13. A catwalk 15 is disposed around the presizer 12 to provide means for visual inspection of the presizer 12. The presizer functions to reduce the solid waste material to a uniform size so that it can be further classified in later stages of the recycling process. The presizer 12 is designed to shred or tear the paper 21 so that its edges 23 are flared, rather than being cut (FIG. 8), wherein the larger the flare and the larger the edges of the paper, the larger the surface area provided on which the air in the recycling process may contact or act thereon. In addition, the flared edges permits visual classification of the paper to determine the particular reprocessing plant to receive the paper. For example, the visual inspection may determine that the paper contains 50 percent or more corrugated paper, or mixed paper of other varieties, or the visual inspection may indicate that the paper consists primarily of commercial corrugated paper. Such classification determines whether or not the paper is sent to a reprocessing plant for making roofing, wall board, or other commercial products.

The paper is reduced to a rectangular size of approximately 4 inches by 5, inches which size has been determined to be the most feasible to work with in the recycling process. The presizer 12, shown in detail in FIG. 3, is adapted to be operated in reverse direction, as indicated by the arrows 44, and must be reversed intermittently during the operation of the process in order to assure the sharpness of the hammers 16. After both sides of the hammer become dull it is reworked or replaced. The hammers 16 reduce the solid waste material to a workable size by forcing the solid waste material through the openings between the grates 14. The hammers 16 are adapted to be repositioned on the rotor 24 by removing the shafts 28 and repositioning them in the holes 26 which holes are on a smaller radius than the holes 28 so that a larger space is provided between the hammer 16 and grates 14. The rotor 24 is driven by a shaft 30 which is keyed to the rotor 24 by keys 32. The shaft 30 is connected to a 1,000 HP electric motor (not shown).

Breaker bars 34 are supported within the presizer by a frame 36 which is adapted to pivot at 38. The parts for adjusting the frame 36 (not shown) are conventional and form no part of this invention.

The solid waste material which is transferred from the conveyor 10 into the hopper 13, passes through the opening 40 into the presizer 12, as illustrated by the arrows 41. The hammers 16, which are pivotally mounted on the shaft 28, cooperate with the breaker bars 34 to reduce the size of the solid waste material so that the material to spiral downwardly as indicated by the arrows 57 and 145. From the cyclone 144 (FIG. 2a), the paper is transferred through duct 146 to a baler 148 for compacting or packaging the paper into bales 152, which bales are directed to a storage area by a conveyor 150. It has been found that bales having a weight of approximately 1,500 pounds can be utilized by reprocessing plants and can be loaded satisfactorily on semi-trailer trucks.

The light plastic and paper from the cyclone 58 falls downwardly through a duct 161, into a diverter 163 having a gate valve 165 for diverting the material to a hopper 156, or to a conveyor 167, at the selection of the operator. If the material is to be shipped to land fill the diverter gate 165 is positioned to divert the material to the conveyor 167 which deposits the material into a tote box or other means of transportation for shipment to a land fill. When the diverter gate is positioned to direct the material into the hopper 156 it is fed by a screw conveyor to a pelletizer 154 which compresses the plastic and paper material to compact its density so that it may be used as fuel. The pelletizer 154 forms the plastic and paper material into pellets 153 (FIG. 9), which are discharged through a conveyor 160 to a tote box or other means of transportation for conveying the pellets to a storage area, or to a power generator.

If desired, a mixture of fine coal can be added to the pelletized material to provide additional BTU'S. In the event the pellets are to be stored outdoors, it has been found desirable to coat the pellets with an adhesive such as lignin to protect the pellets from moisture, and to render the pellets pathogenic free. After the pellets have been coated with adhesive they may be passed through a drier which will set the adhesive. In the event the pellets are fed directly to a power generator, or used within a relatively short period of time, it has been found that it is not necessary to add the adhesive coating and, therefore, unnecessary to pass the pellets through a drier.

It will thus be seen that our invention provides an improved method for separating solid waste material into identifiable classifications by recycling the solid waste material through a number of devices which reduces the solid waste material to a uniform workable particle size and, thereafter separating the particles by weight, size and magnetic properties. Persons skilled in the art will appreciate that modifications may be made to the process in accordance with our invention. For example, the hopper 156 and pelletizer 154 may be located so that the diverter 163 can, when appropriate, direct the material onto the conveyor 90 and thus eliminate the conveyor 167. In some cases it may be desirable to locate the solid waste separating plant at a paper mill, in which event it would not be necessary to bale the paper which could be fed directly to the reprocessing plant. Also the recycling process may be used with, or without, the conveyor 89. If it is desired to recover glass during the operation of the process, the conveyor 89 is disposed under the opening 88 in the screener 78. If it is desired not to recover the glass, the conveyor 89 is removed and the glass or other fine particles are dropped directly onto the conveyor 90. Therefore, while our invention has been described with reference to a particular recycling process, it is to be understood that modifications may be made without departing from the spirit of our invention.

What we claim as new and desire to secure by Letters Patent of the United States is:

1. The method of separating solid waste material including paper and plastic into identifiable classifications which comprises:
   a. passing the solid waste material through a presizer for reducing the solid waste material to a substantial uniform workable particle size,
   b. conveying the uniform workable particle size waste material under an aspirator to separate by weight part of the light solids including light paper and light plastic from the heavy solids including heavy paper and heavy plastic,
   c. transferring by air the light solids including light paper and light plastic removed by the aspirator to a first cyclone,
   d. conveying the heavy solids including the remaining light solids to a vibrating screener for separating the heavy solids by particle size and separating the remaining light solids from the heavy solids,
   e. passing the light solids including the heavier paper and heavier plastic solids through a rotary screener, and
   f. separating the remaining light paper from the remaining heavier plastic solids and transferring the remaining light paper to the first cyclone and transferring the remaining heavier plastic solids to a second cyclone.

2. The method of separating solid waste material into identifiable classifications which comprises:
   a. passing the solid waste material including paper and plastic through a presizer for reducing the solid waste material to a substantial uniform workable particle size;
   b. conveying the uniform workable particle size waste material under an aspirator to separate by weight the light solids from the heavy solids;
   c. conveying the heavy solids to a screener for separating the heavy solids by particle size and removal of dust carried by the heavy solids;
   d. transferring the light solids to a plastic and paper separator to separate by weight the plastic material and light paper from the heavy paper material;
   e. and passing the light paper and plastic material through a pelletizer to compact the paper and increase the density thereof.

3. The method of separating solid waste material as set forth in claim 2 wherein the presizer reduces the paper by shredding so that the frayed edges of the torn paper can be used for visual classification of the grade of paper being processed.

4. The method of separating solid waste material as set forth in claim 3 wherein the paper is shredded in a maximum uniform size of approximately 5 inches by 4 inches for separating the paper from the other solid material.

5. The method of separating solid waste material as set forth in claim 2 wherein the reduced waste material falls from the presizer onto a vibrating conveyor for distributing the reduced waste material in a uniform manner onto an endless belt conveyor.

6. The method of separating solid waste material as set forth in claim 2 including the step of passing the reduced solid waste material under an electromagnetic conveyor for removing the ferrous material therefrom and releasing the ferrous material from the electromagnetic conveyor at a predetermined point so that the ferreduced material can be transferred into the effective reduction area 42. As the solid waste material progresses downwardly, the hammers 16 will force the solid waste material through the gates 14 which are spaced in a manner to presize the paper and other solid materials to a uniform workable size for the subsequent steps in the recycling process. To reverse the operation of the presizer 12 the leads on the electric drive motor are reversed so that the rotor 24 will rotate in the direction indicated by the arrows 44.

The presized solid waste material, after passing through the grates 14, falls onto a vibrating conveyor 46. The vibrating conveyor 46 functions to spread or even out the distribution of the solid waste material and transfers the solid waste material to an endless belt conveyor 48.

Referring to FIG. 2a, an aspirator hood 50 is disposed above the vibrating conveyor 46 and is connected to a blower 52 through a duct 54. The blower 52 utilizes the opening 40 of the presizer 12 as an inlet to pull air through the presizer 12 and the aspirator 50. A flapper valve 56 is disposed in the conduit 54 for adjusting or controlling the amount of air flow therethrough. The inlet air is preadjusted so that very light paper and plastic can be removed from the vibrating conveyor 46 and transferred to a fuel cyclone 58 through duct 54 and duct 60. In this step of the recycling process the blower 52 removes primarily plastic material which is usually lighter in weight than paper. However, paper having substantially the same weight as plastic, such as kleenexes, will also be removed from the vibrating conveyor 46.

The endless conveyor 48 receives the remaining solid material from the vibrating conveyor 46 and serves to move the solid waste material from the presizer 12 to a cross-vibrating conveyor 62, which serves to further distribute or even out the solid waste material for further treatment in the recycling process. The conveyor 48 is provided with an adjustable tensioning roll 49 for maintaining the proper tension on the conveyor belt.

An electromagnetic cross-conveyor 64, driven by an electric motor 66, is disposed above the conveyor 48 for removing the ferrous material therefrom. The magnetic conveyor 64 is designed to release the ferrous material as it reaches a predetermined point adjacent the motor 66 so that the ferrous material will fall onto a vibrating conveyor 68 which functions to spread or even out the flow of the ferrous material dropped thereon so that when it passes under aspirator 70 any unwanted material, which may have attached itself to the ferrous material, is removed. A blower 72 is connected to the aspirator 70 by duct 74, and to a vibrating screener 78 by a duct 76. The clean ferrous material is discharged from the conveyor 68 into a tote box or other means of transportation (not shown) for conveyance to a reprocessing plant.

Figure 4:
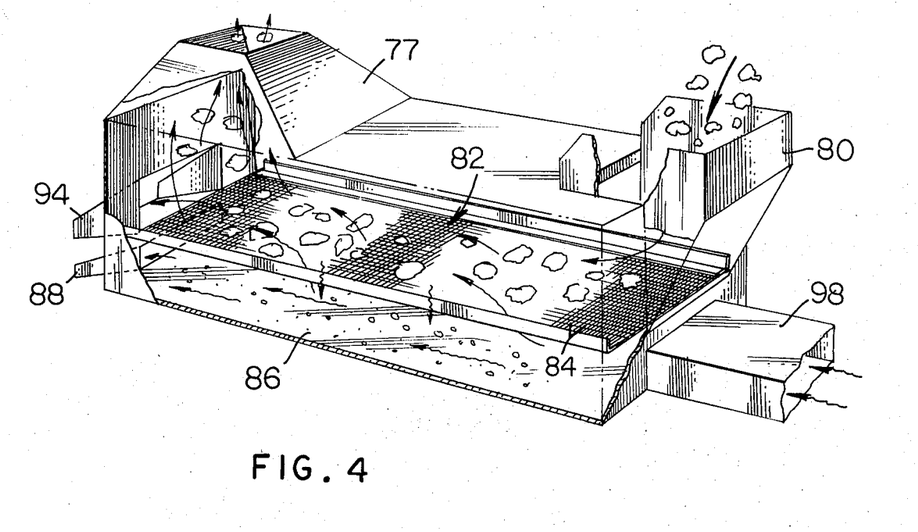
FIG. 4 is a perspective view, partly broken away, of the vibrator screener.
Figure 5:
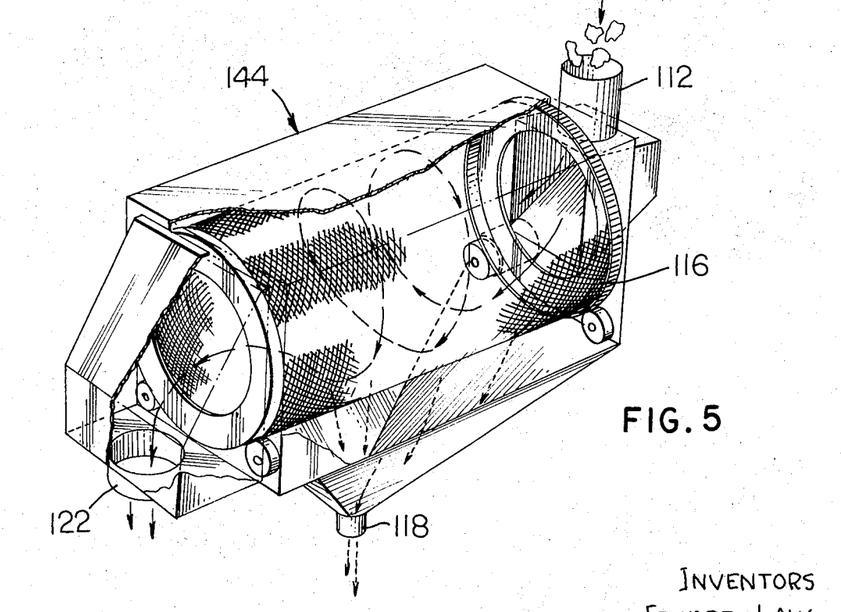
FIG. 5 is a perspective view, partly broken away, of the rotary screener.

The non-ferrous material, which is conveyed past the magnetic separator 64 on the conveyor 48 and vibrating conveyor 42, is discharged into the screener-separator 78 through the hopper 80. Referring to FIG. 4, the non-ferrous materials are discharged from the hopper 80 onto a vibrating screen 82 having openings 84 to permit passage of small particles therethrough. The particles passing through the openings 84, fall upon a vibrating deck 86, which transfers the particles out through an opening 88 onto a conveyor 89, which transfers the small particles to a tote box or other means of transportation to a reclaiming plant. Usually the small particles are glass, and in the event the solid waste material contains no glass, the conveyor 89 may be removed and the small particles which fall through the openings 84 onto the vibrating deck 86 pass out through the opening 88 onto a slat conveyor 90 along the inner edge thereof, which conveyor transfers the small particles to a truck, railroad car, or other means of transportation to a land fill. The larger fractional particles, which are too large to pass through the openings 84, are transferred through outlet 94 onto the outer portion of the conveyor 90. It has been found profitable to monitor the conveyor 90 for the removal of valuable material, such as aluminum, copper and brass, which is placed in a tote box 92 for shipment to a smelter. The double-deck screener 78 functions to separate the solid waste material into two fractions, namely, one large and one small. The glass, usually being a smaller particle, will pass through the openings 84 onto the vibrating plate 86 and out the opening 88.

Figures 6, 7, 8, 9:
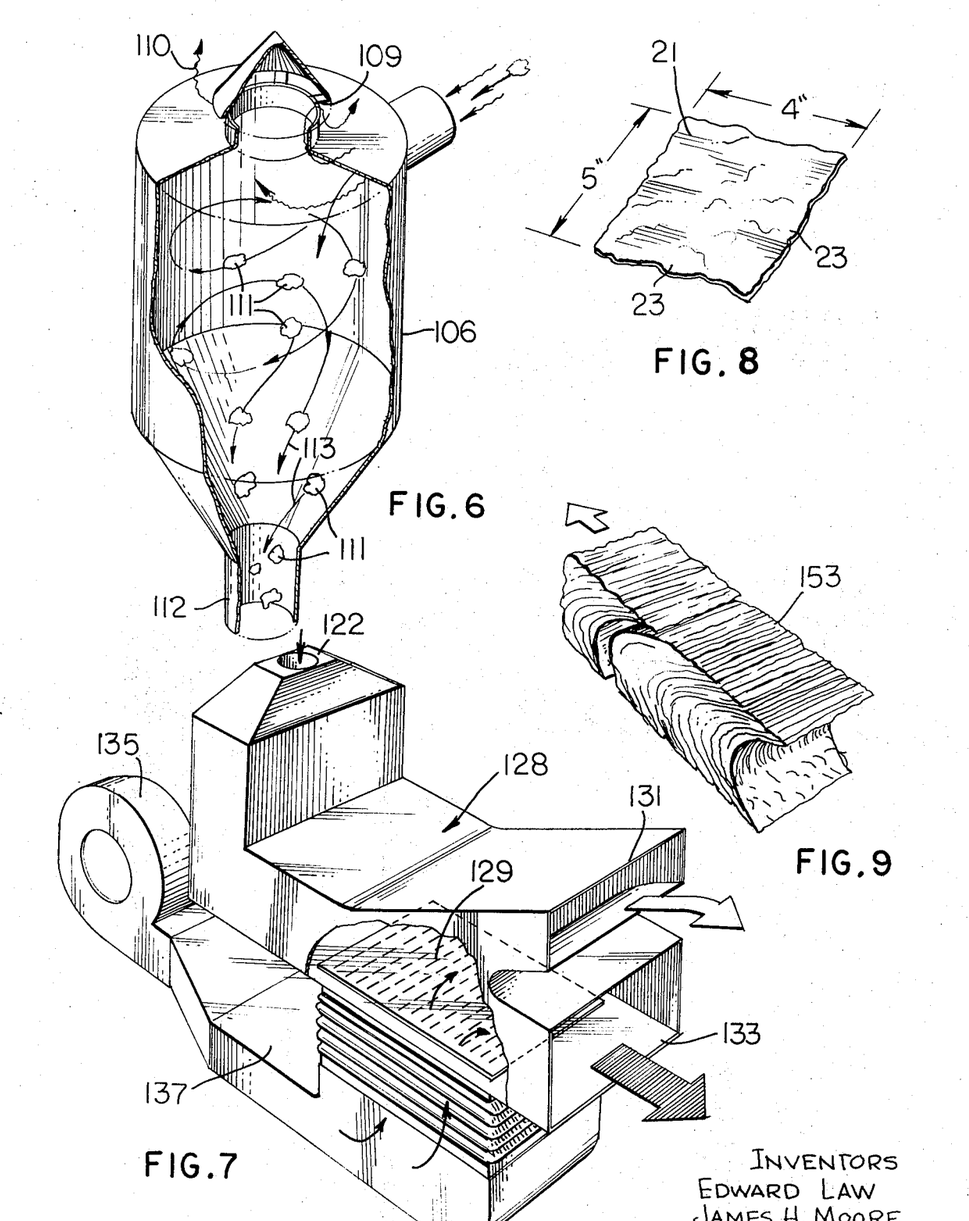
FIG. 6 is a perspective view, partly broken away, of the air cyclone.
FIG. 7 is a perspective view, with parts broken away, of the paper and plastic separator.
FIG. 8 is a perspective view of the shredded paper.
FIG. 9 is a perspective view of a pellet which has been compressed by the pelletizer.

As illustrated in FIGS. 2b and 4, a blower 96 provides air to a duct 98 for passing the air over the vibrating deck 86, up through the openings 84 into a hood 77 which is disposed above the outlet end of the screener 78, and then through a duct 104 to a cyclone 106. A flap valve 108 is provided in the line 104 to adjust or regulate the velocity of air passing through the duct 104. The velocity of air is such that particles of paper, including small particles of plastic, will be transferred through the hood 77, duct 104, to cyclone 106. It should be noted that the duct 104 is disposed in a tangential relationship with the cyclone 106 to give a whirling effect to the air as it enters the cyclone 106. Upon entering the cyclone, the air will expand thus changing its velocity due to the cyclone's enlarged diameter, whereby the air will escape through a vent 109 as indicated by the arrows 110, illustrated in FIG. 6. The cyclones 106, 144 and 58 operate on the same principle and function as an air release to permit the small particles of paper and plastic, indicated by the reference numeral 111, to float downwardly in a spiral manner as indicated by the arrows 113. Since all the cyclones operate in the same manner, only one has been described in detail. From the cyclone 106 the small particles of paper and plastic falls into the duct 112 which discharges into a rotary screen 114 (FIG. 2b and FIG. 5) having therein a rotating tumbler 116 which separates the fine particles, such as dirt and glass, and other fine materials which have not been previously removed. The fine materials are discharged through duct 118 to a screw conveyor 120 for discharge to a tote box or other means of transfer to a land fill. The paper and plastic materials are discharged through an opening 122, into a plastic and paper separator 128 (FIGS. 2b and 7). The plastic separator 128 is provided with an adjustable baffle 129 for directing the air to outlets 131 and 133. A blower 135 supplies air to the plastic and paper separator 128 through a duct 137. The velocity of the air passing through the plastic separator 128 is controlled by the adjustable baffle 129 and the valves 132 and 134, disposed in the ducts 140 and 142 respectively. The plastic and light paper passes through opening 131, duct 140 to the cyclone 58, and the heavier paper passes through outlet opening 133, duct 142 to the cyclone 144.

The cyclones 58 and 144 release the air through their respective vents 109 to the atmosphere, permitting the rous material will be dropped onto a conveyor for transfer to a salvage area.

7. The method of separating solid waste material as set forth in claim 2 including the step of passing the reduced solid waste material through a vibrating screener to remove glass, sand, stones and food particles from the reduced solid waste material.

8. The method of separating solid waste material into identifiable classifications which comprises:
   a. passing the solid waste material through a presizer for shredding the solid waste material to a small substantially workable particle size,
   b. conveying the shredded material through a first aspirator to separate by weight the light solids from the heavy solids,
   c. transferring the light solids through a duct by air to a first cyclone wherein the air is released to the atmosphere,
   d. conveying the heavy solids to a vibrating screener for further separation of the solid material by particle size,
   e. transferring the light solids separated in the vibrating screener by air through a second aspirator and duct to a second cyclone wherein the air is released to atmosphere,
   f. conveying the heavy solids passing from the vibrating screener to a disposal area,
   g. transferring the solid waste material from the second cyclone to a rotary screener for separating the heavy solids by particle size wherein the lighter solids are transferred to a plastic and paper separator and the heavier solids are transferred to a disposal area,
   h. transferring the light solids separated by the plastic and paper separator by air to the first cyclone and transferring the heavier solids by air to a third cyclone wherein the air is released to the atmosphere,
   i. passing the light solids from the first cyclone through a pelletizer to compact the light solids and increase the density thereof, and
   j. passing the heavy solids from the third cyclone to a baler to compact the heavy solids into bales.

9. The method of separating solid waste material as set forth in claim 8 including the step of blending fine coal with the pelletized solids for fuel consumption.

10. The method of separating solid waste material as set forth in claim 8 including the step of conveying the bales from the baler to a disposal area for shipment to a paper mill.

11. The method of separating solid waste material as set forth in claim 8 including the step of passing the solid waste material coming from the presizer under an electromagnetic conveyor for removing the ferrous material therefrom and conveying the ferrous material through a third aspirator for removing light non-ferrous material which may be carried over by the ferrous material, and transferring the non-ferrous material to the vibrating screener.

12. The method of separating the solid waste material as set forth in claim 8 including the step of controlling the air to each cyclone by valve means disposed in the duct leading to each cyclone.

13. The method of separating solid waste material as set forth in claim 8 including th step of transferring the large solid material and smaller solid material to separate locations on a conveyor for transfer to a disposal area.

14. The method of separating solid waste material as set forth in claim 8 including the step of transferring the larger solid material which is primarily glass to a disposal area.

15. The method of separating solid waste material as set forth in claim 8 wherein the heavier solids separated by the rotary screener are removed by a rotating screw conveyor to a disposal area.

16. The method of separating solid waste material as set forth in claim 8 including the steps of blending fine coal with the light solids prior to being pelletized and adding a fine coating of water proofing to the pellets to permit storage of the pellets out of doors.

* * * * *